United States Patent [19]

Humphries, Sr.

[11] Patent Number: 5,014,530

[45] Date of Patent: May 14, 1991

[54] AUTO ANTI-THEFT DEVICE

[76] Inventor: Donald Humphries, Sr., 215 E. Jefferson St., Pittsburgh, Pa. 15212

[21] Appl. No.: 544,631

[22] Filed: Jun. 27, 1990

[51] Int. Cl.⁵ .............................................. E05B 47/00
[52] U.S. Cl. ...................................... 70/277; 72/352; 72/278
[58] Field of Search ................. 70/277, 278, 352, 276, 70/279–282, 405

[56] References Cited

U.S. PATENT DOCUMENTS 3,780,548  12/1973  Anastason ............................ 70/352
4,149,394   4/1979  Sornes .................................. 70/352
4,390,758   6/1983  Hendrickson ........................ 70/277
4,674,307   6/1987  Humphries ........................... 70/278

Primary Examiner—Robert L. Wolfe
Attorney, Agent, or Firm—William J. Ruano

[57] ABSTRACT

An automotive theft preventing circuit including a battery, ignition switch and starter connected in series. An anti-theft device connected in series therewith comprising a metallic adjusting screws contact plate and a spring loaded contact pins plate underneath it. A coded plastic card is underneath the last-mentioned plate having a plurality of upstanding pins and a plurality of holes in vertical and horizontal alignment with openings in the spring-loaded contact pins plate. Some of the metallic screws are surrounded by insulation to make the circuit more theft-proof.

3 Claims, 3 Drawing Sheets

AUTO ANTI-THEFT DEVICE

BACKGROUND OF THE INVENTION

This is an improvement of the auto anti-theft device covered by my previous U.S. Pat. No. $\propto$,674,307 dated June 23, 1987.

There has been a major problem in this country with the theft of automobiles, running into the millions, plus the cost exceeding billions of dollars to repair or replace them.

There has been a flood of different kinds and types of auto anti-theft devices that have entered the market place to date. However, thieves are still able to circumvent them and drive the car away. The present device makes it exceedingly difficult to circumvent.

SUMMARY OF THE INVENTION

This is a device that will re-route the electrical current through it, and where the connection will be made to complete the circuit to start and run an automobile by inserting a coded card.

The coded card would be carried the same as car keys and would be used only when starting and operating an automobile. This coded card would connect the vital electrical components that have to do with the starting and continuous running of one's automobile, such as the starting motor, fuel injectors or the distributor. Using the present device would make it more difficult or impossible for a thief to start and drive the automobile away.

The device consists of a compartment that houses three main components: namely a metal contact pins plate, a plastic spring-loaded contact pins plate, and two or three normally closed relay switches.

DESCRIPTION OF THE PREFERRED EMBODIMENT

Figure 1:
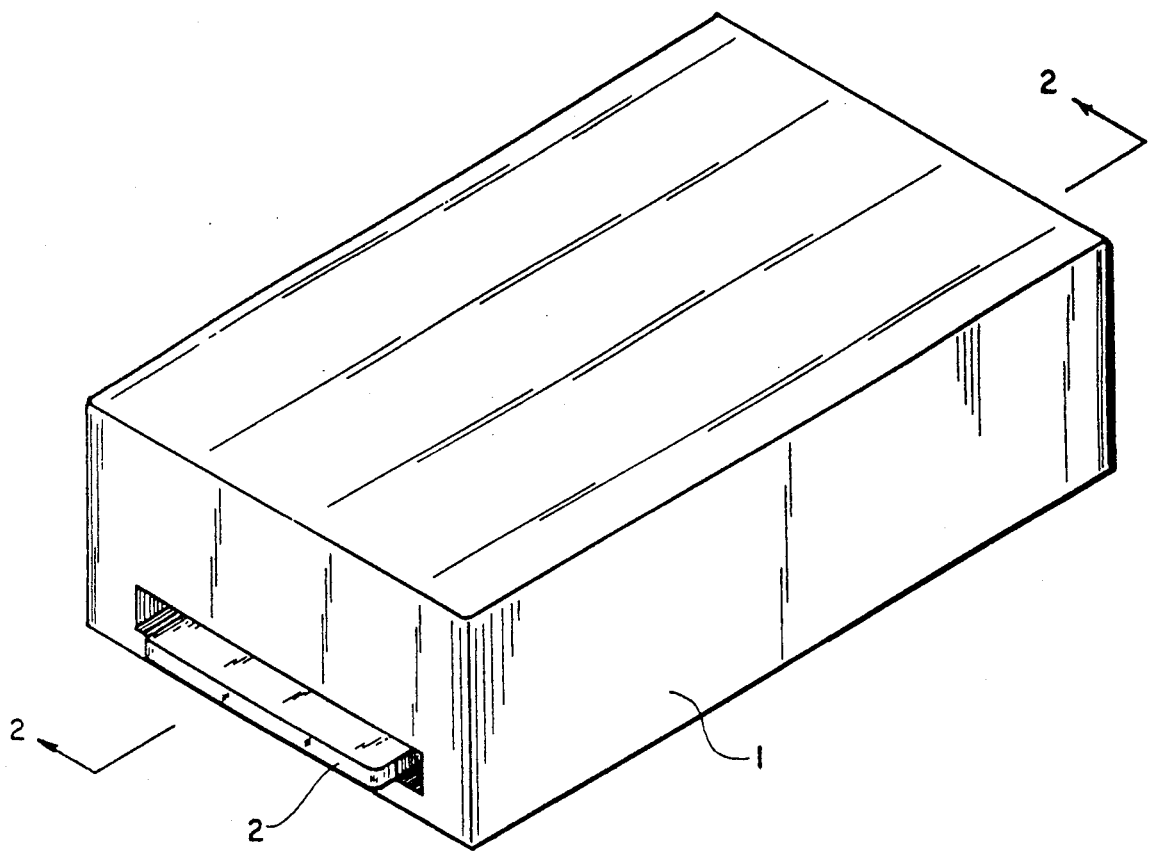
FIG. 1 is a top perspective view of a compartment housing the present invention.
Figure 2:
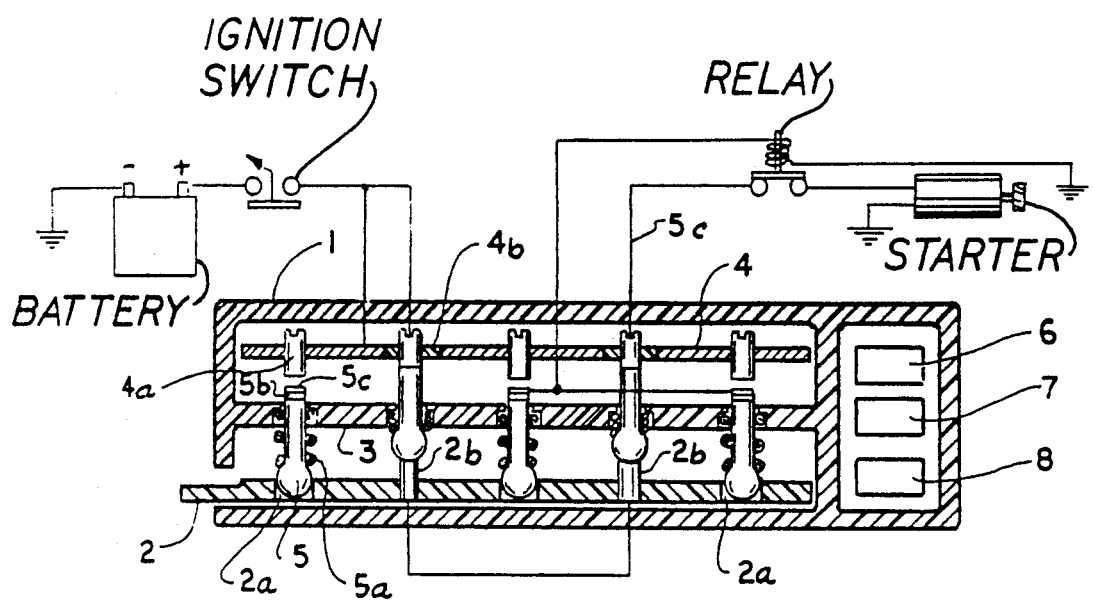
FIG. 2 is a sectional view taken along line 2—2 of FIG. 1.
Figure 3:
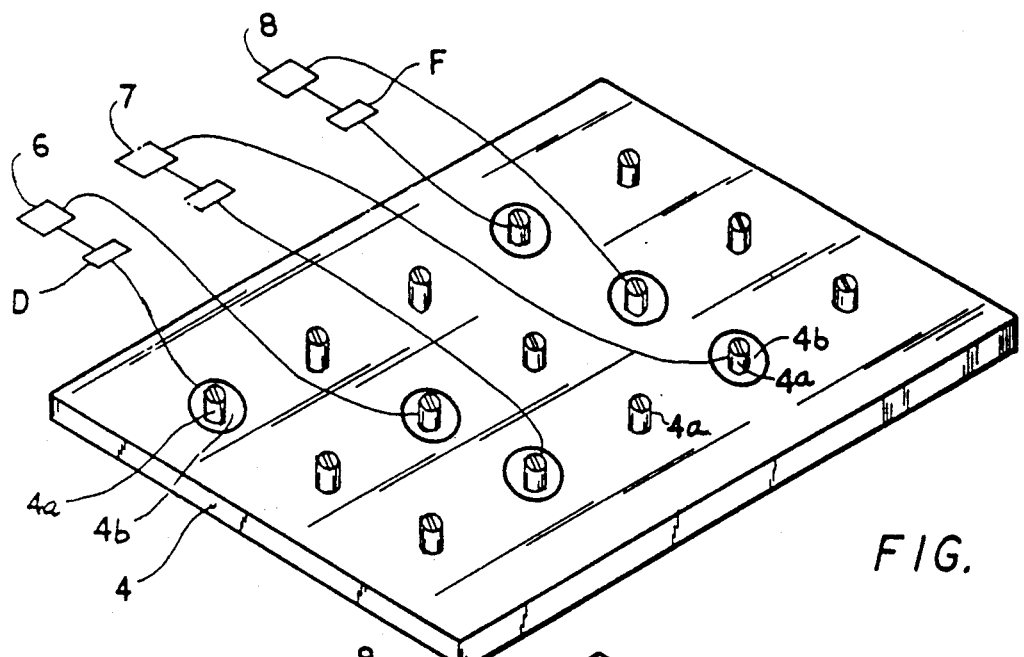
FIGS. 3, 4 and 5 are an exploded view showing the contents of FIGS. 1 and 2.
Figure 4:
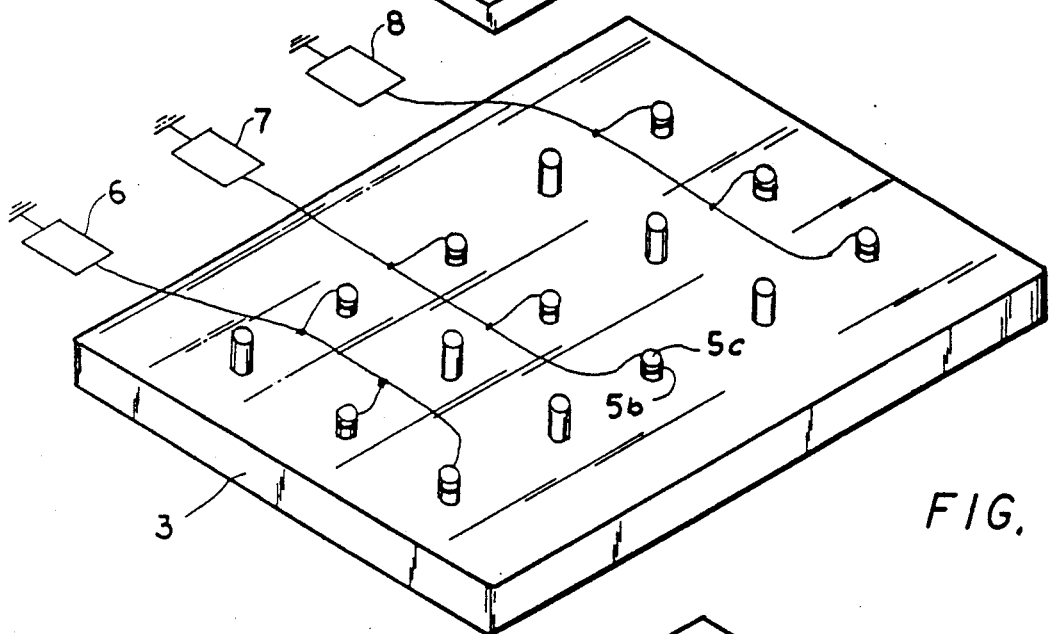
Figure 5:
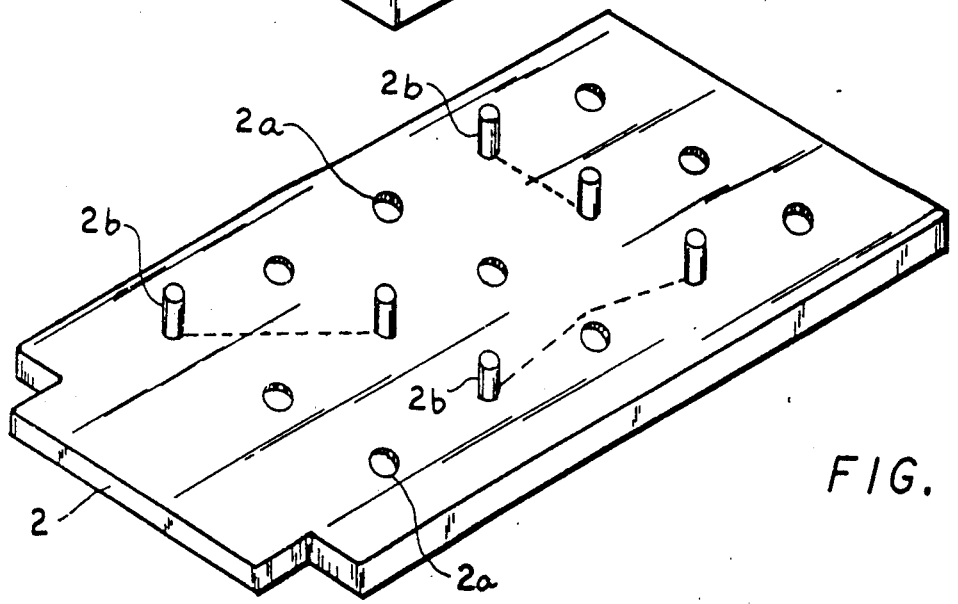
Figure 6A:
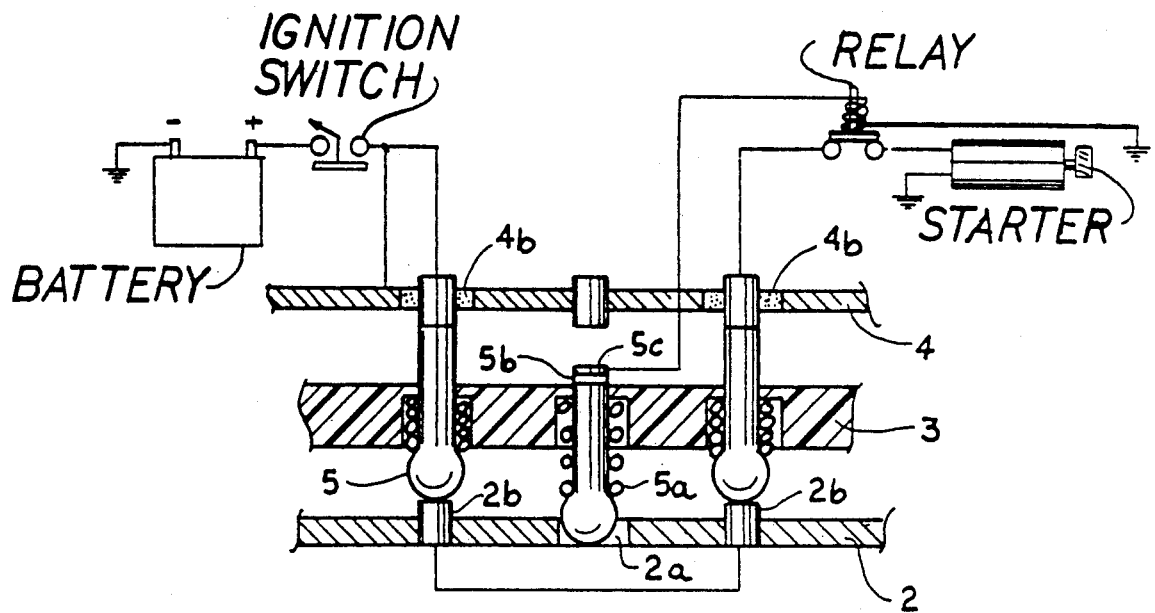
FIGS. 6A and 6B are circuit diagrams illustrating correct and incorrect coded cards, respectively.
Figure 6B:
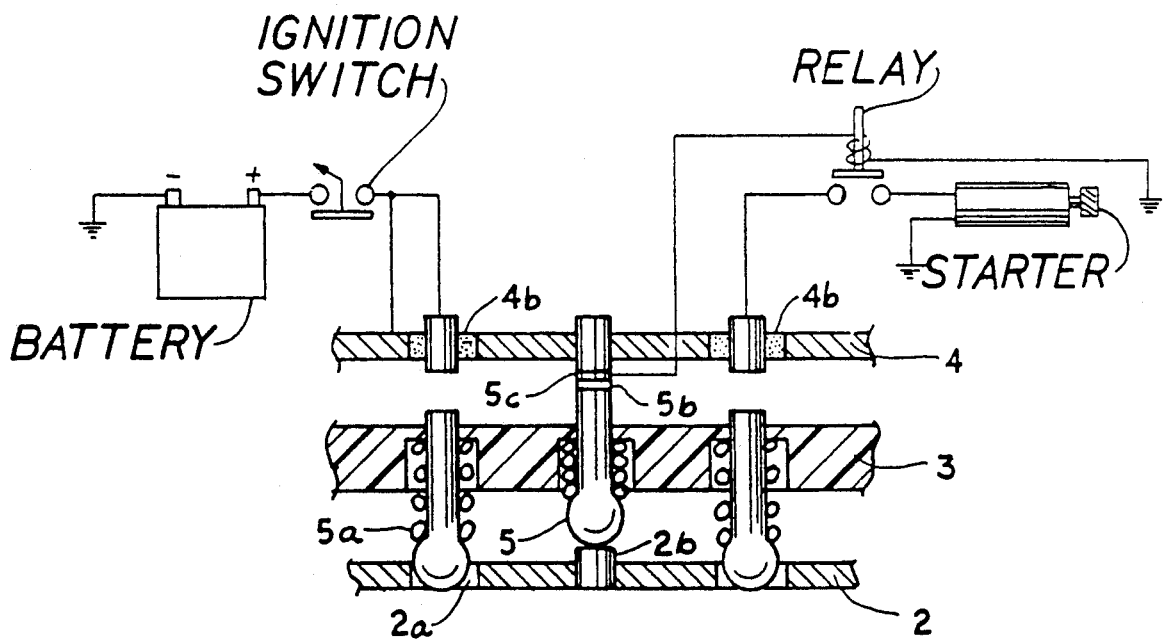

The metal contact pins plate 4 will have the same number of pins 4a that the lower spring loaded contact pins plate 3 has, also the coded card 2. All of the pins located in the upper metal contact pins plate 4 and lower spring loaded contact pins plate 3 must line up horizontally and perpindicularly to each other, perfectly to make this system work the way it was designed to work, when the right coded card has entered into its proper place when starting an automobile.

The metal contact pins plate 4 will have screw type adjusting pins 4a so as to get the proper clearance between the metal contact pins bottoms 4a and the tops of the spring loaded contact pins 5. These two plates will be held inside the housing comparment 1 by plastic guides, one on either side.

Certain contact pins 4a located in this metal contact pins plate 4 will be insulated by plastic 4b around them, with the same thickness as the metal plate that houses them. These are the ones that will have wires 5c attached near their tops and going from there through the normally closed relay switches 6, 7 and 8 and on to the vital electrical part programmed to correspond with the coded card 2 and the other wires going directly to that part to complete the electrical circuit when the right coded card is used. This plate will have a wire connecting it to the ignition switch, that will energize this plate when the ignition is turned on.

Plastic spring loaded contact pins plate 3 has metal spring loaded contact pins 5 encased in a plastic housing 3 so as not to send electrical current from one pin to another. Some of the pins located in this plate will be all metal. They are the ones that will make contact with the correct pins in the upper metal adjusting contact screw pins 4a to complete the electrical circuit and make it possible to start and operate the automobile.

All other pins located in this plate will have plastic spacers 5b near their tops with metal caps 5c at their tops that will have wires attached to the metal caps and going from there to the wrong side of the normally closed relay switch, causing it to sound the alarm by blowing the horn and open the circuit and preventing a thief from starting and operating the automobile.

There will be one normally closed relay switch for each vital electrical part that is put through the system. Electrical current will flow freely through these relay switches when directed in the right channels, but when the electrical current is directed the wrong way and the switches are grounded, the normally closed relay will open the circuit, making it impossible to start or operate the automobile.

The coded card 2 is carried by the driver the same as car keys, and would be used only when starting and for the continuous operation of the automobile. This coded card will have the same number of contact points with embedded wires (shown dotted) connecting two points to correspond with the same pins located in the spring loaded contact pins plate 3 and the metal adjusting screws pins plate 4, where all other pins are located in the upper pins plate. This card 2 will have round open holes, 2a and so they won't make contact or push up any of the pins.

An automobile thief is interested in stealing an automobile quickly. He does not have time for making many alterations.

While I have illustrated and described a single specific embodiment of my invention, it will be understood that this is by way of illustration only and that various changes and modifications may be contemplated in my invention within the scope of the following claims.

I claim:

1. In an automotive circuit including a battery, ignition switch and starter connected in series, the improvement comprising an anti-theft device connected in series therewith comprising a housing enclosing a metallic adjusting screws contact pins plate, a spring-loaded contact pins plate underneath thereof, and a coded plastic card underneath said spring-loaded contact pins plate having a plurality of upstanding pins and a plurality of holes in vertical and horizontal alignment with openings in said spring-loaded contact pins plate.

2. An automotive circuit as recited in claim 1 wherein some of said metallic adjusting screws are surrounded by insulation to electrically insulate them from said first mentioned plate.

3. An automotive circuit as recited in claim 2 together with terminals on top of insulation on some of said spring-loaded contact pins plate.

* * * * *